United States Patent [19]

Ingram et al.

[11] 4,104,975
[45] Aug. 8, 1978

[54] TRANSPLANTING APPARATUS

[75] Inventors: Lawrence L. Ingram; Javier D. Infante, both of Salinas, Calif.

[73] Assignee: Bud Antle, Inc., Salinas, Calif.

[21] Appl. No.: 757,995

[22] Filed: Jan. 10, 1977

[51] Int. Cl.² ............... A01C 11/02; A01C 9/06
[52] U.S. Cl. ........................... 111/3; 111/34; 111/77; 221/219
[58] Field of Search ............ 111/2, 3, 77, 89–91, 111/34; 221/217–220, 210

[56] References Cited

U.S. PATENT DOCUMENTS

| 342,490 | 5/1886 | Zimmermann | 111/3 |
| 653,298 | 7/1900 | King | 111/3 |
| 1,230,806 | 6/1917 | Shaffer | 111/3 |
| 2,372,739 | 4/1945 | Renault | 111/3 |
| 2,804,033 | 8/1957 | Burroughs | 111/3 |

FOREIGN PATENT DOCUMENTS

| 77,956 | 12/1962 | France | 111/3 |
| 882,330 | 7/1953 | Fed. Rep. of Germany | 111/3 |
| 570,210 | 12/1957 | Italy | 111/3 |
| 262,279 | 1/1929 | Italy | 111/3 |
| 868,362 | 5/1961 | United Kingdom | 111/77 |
| 627,358 | 8/1949 | United Kingdom | 111/3 |
| 857,642 | 1/1961 | United Kingdom | 111/3 |
| 296,503 | 4/1971 | U.S.S.R. | 111/3 |
| 231,252 | 10/1970 | U.S.S.R. | 111/3 |

Primary Examiner—Edgar S. Burr
Assistant Examiner—Steven A. Bratlie
Attorney, Agent, or Firm—Thomas H. Olson

[57] ABSTRACT

Apparatus for introducing into a prepared field surface a plurality of seedling bodies each of which includes a small plant that is growing in a root supporting medium. A conveyor onto which the seedling bodies are placed and a mechanism for receiving the seedling bodies in sequence from the conveyor for transporting them to a trench in the field surface. The transporting device includes two pivotable jaws and strategically located cams for opening and closing the jaws to receive the plant from the conveyor and them to deposit the plant into the trench at the correct location and position. A drive mechanism for the conveyor so that the plants are delivered to the transporting means at the proper time and position.

4 Claims, 13 Drawing Figures

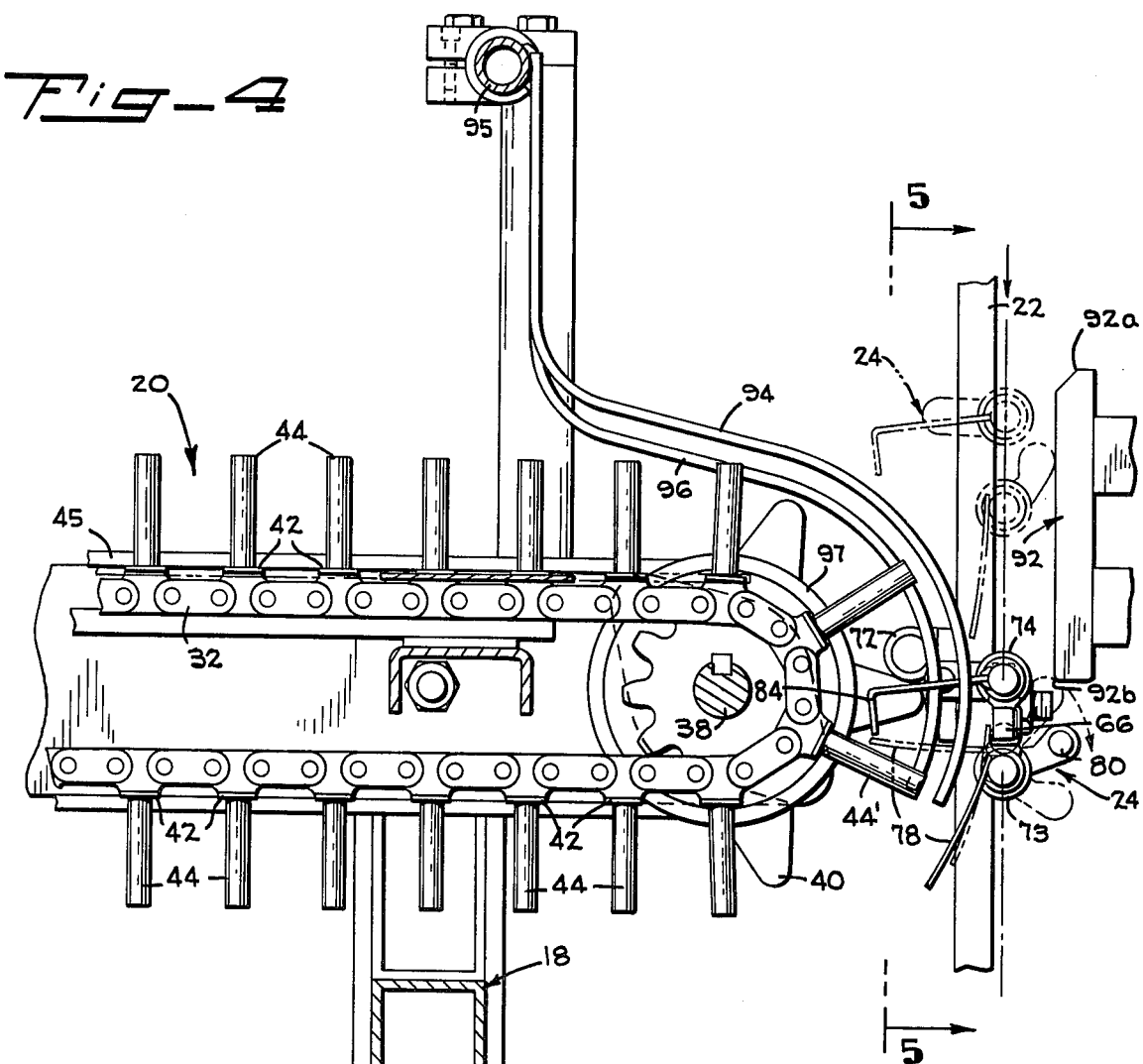
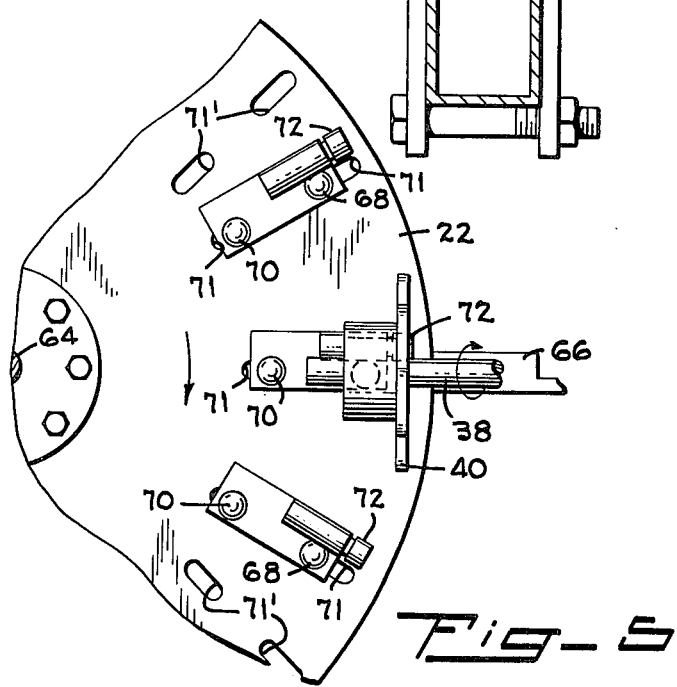
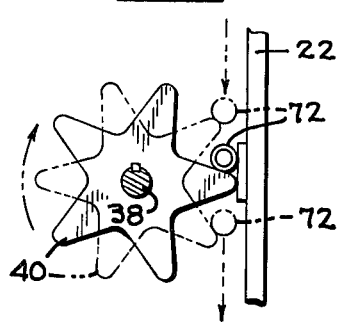

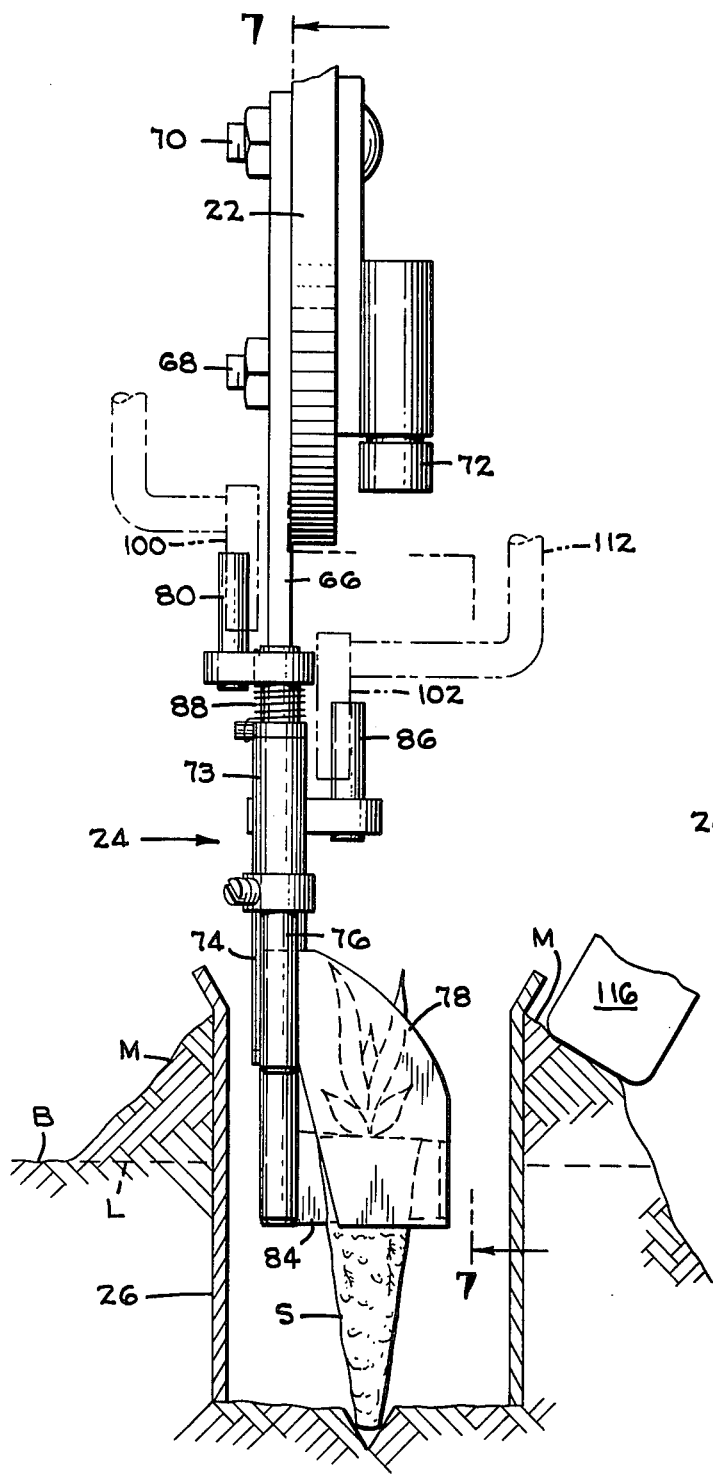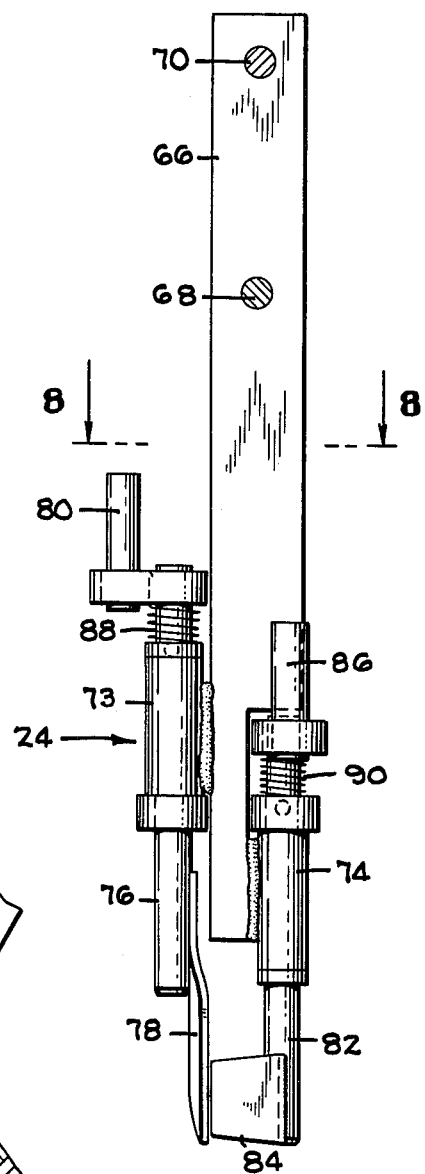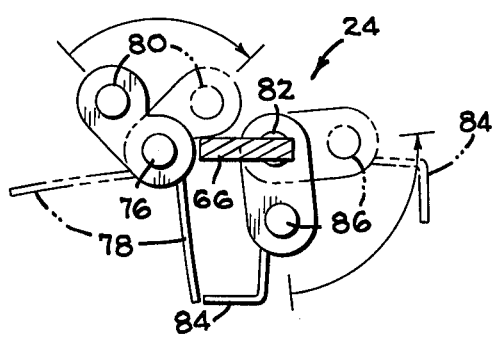

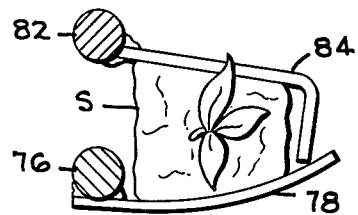
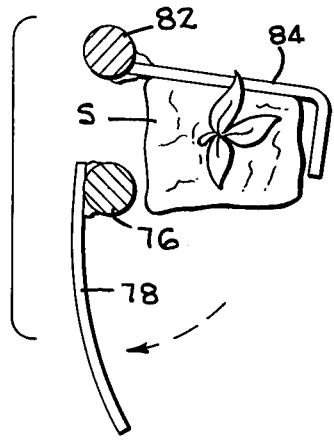
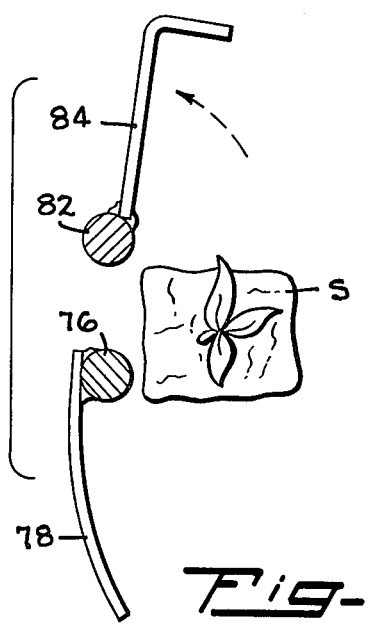
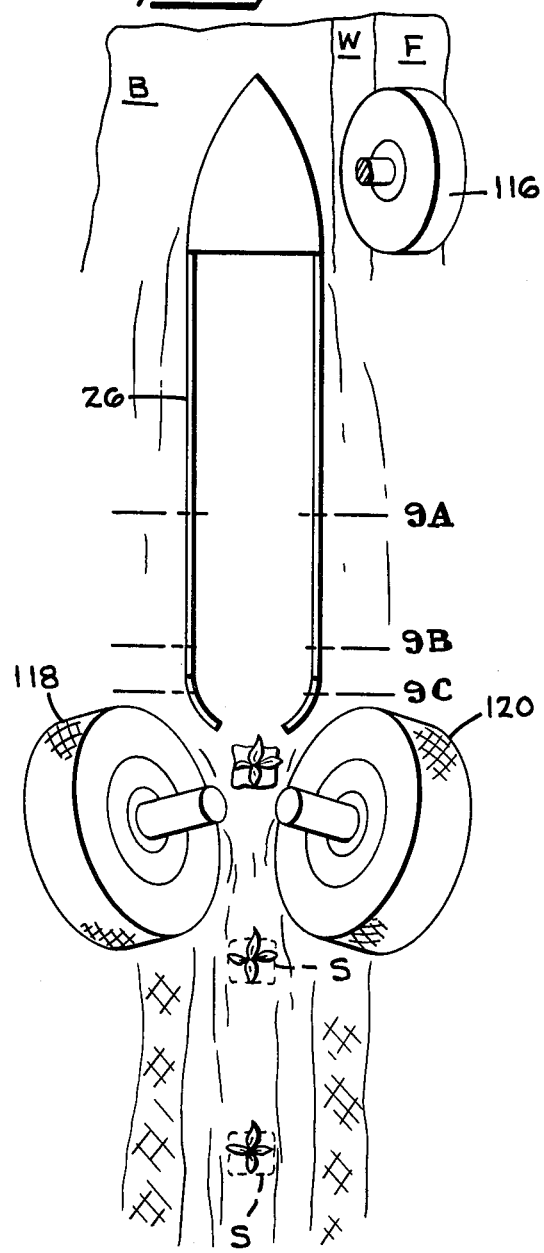

TRANSPLANTING APPARATUS

BACKGROUND OF THE INVENTION

1. Field of the Invention

This invention relates to a transplanting apparatus that is drawn over a prepared field for introducing into the field seedling bodies and more particularly to such apparatus that places the seedling bodies with precision and accuracy in the field surface.

2. Description of the Prior Art

Among presently known prior art transplanters is the apparatus disclosed in Shirozu U.S. Pat. No. 3,374,752 (111-2) which describes a transplanter for transplanting seedlings growing from a mass of dirt contained in a paper cylinder into a field surface. Because the root supporting media is housed in a paper cylinder, the patented transplanter apparently operates satisfactorily notwithstanding that the cylinder is subjected to substantial compressive and other forces during its traverse of the machine. Attempting to transplant more fragile articles, such as seedling bodies started in a greenhouse in a seedling tray as disclosed in U.S. Pat. No. 3,667,159, is not satisfactory in view of the relative fragility of the body of root supporting media which has no protective covering.

The transplanter described in the Shirozu Patent has a plant conveyor and a device for transporting the plants from the conveyor down to the field surface. Because the conveyor and the transporting device are both driven from the same power train, the patented machine functions to deposit the plants onto the field at only one fixed spatial relationship whereby the machine cannot accommodate different crops and/or different growing conditions wherein different interplant spacings might be required.

The machine described in the Shirozu Patent includes a pair of plant gripping jaws, one of which is fixed. The leaves or stalks of certain plants tend to engage the fixed jaw and are subject to being dislodged from the field surface in response to advancement of the machine thereover or to being deposited in a skewed position.

SUMMARY OF THE INVENTION

The present invention provides an apparatus that is transported over a prepared field surface and places in the field surface at precisely spaced apart intervals a series of plants, such as lettuce plants.

An object of the invention is to provide apparatus that is capable of placing the plants in an upright position so as to assure proper growth of the plants. This object is achieved in accordance with the invention by providing a plant gripping assembly composed of two pivotally mounted plates and by providing for the sequential pivotal movement of the plates so as to support the plant in an upright position in a trench in the field surface until the trench is at least partially back filled and to avoid dislodgement of the plant as the apparatus moves away from the plant.

Another object of the invention is to provide a seedling body conveyor and a drive mechanism for the conveyor that operates to supply the plants one by one to the above mentioned clamping assemblies irrespective of the speed of movement of the apparatus over the field surface.

A further object is to provide transplanting apparatus in which the interval between adjacent plants can be altered by relatively simple adjustments on the field, the conveyor drive mechanism referred to above being adapted to achieve efficient sequential loading irrespective of the particular interval at which the plants are placed in the field surface.

Still another object is to provide an apparatus wherein the vertical disposition of the plants in the field surface is precisely controlled so that the depth of transplanting is optimized. This object is achieved by providing a shoe which is drawn through the field surface to open up a trench therein, an upstream packing wheel to cooperate with the shoe in assuring symmetry of the sides of the trench and a downstream pair of packing wheels to achieve symmetrical back filling of the trench after deposit of the plants thereinto.

The foregoing together with other objects, features and advantages will be more apparent after referring to the following specification and the accompanying drawings.

BRIEF DESCRIPTION OF THE DRAWINGS

FIG. 4 is an elevation view in cross section taken along line 4—4 of FIG. 3.

FIG. 4A is a fragmentary view of a detail of FIG. 4 showing the conveyor drive mechanism.

FIG. 5 is a fragmentary view taken along line 5—5 of FIG. 4.

FIG. 6 is an elevation view of the plant gripping assembly taken along line 6—6 of FIG. 1.

FIG. 7 is a side view of the plant gripping assembly taken along line 7—7 of FIG. 6.

FIG. 8 is a cross sectional view of the plant gripping assembly taken along line 8—8 of FIG. 7.

FIG. 9 is an elevation view showing the trench forming shoe and the packing wheels that cooperate to preserve the shape of the trench and to back fill the same.

FIG. 9A is a partially schematic view of the plant gripping mechanism shown engaging the plant.

FIG. 9B is a view similar to view 9A showing the plant gripping mechanism partially disengaged from the plant during placement thereof in the trench.

FIG. 9C is a view similar to FIG. 9B showing the planting mechanism fully disengaged from the plant.

DESCRIPTION OF THE PREFERRED EMBODIMENT

Figure 1:
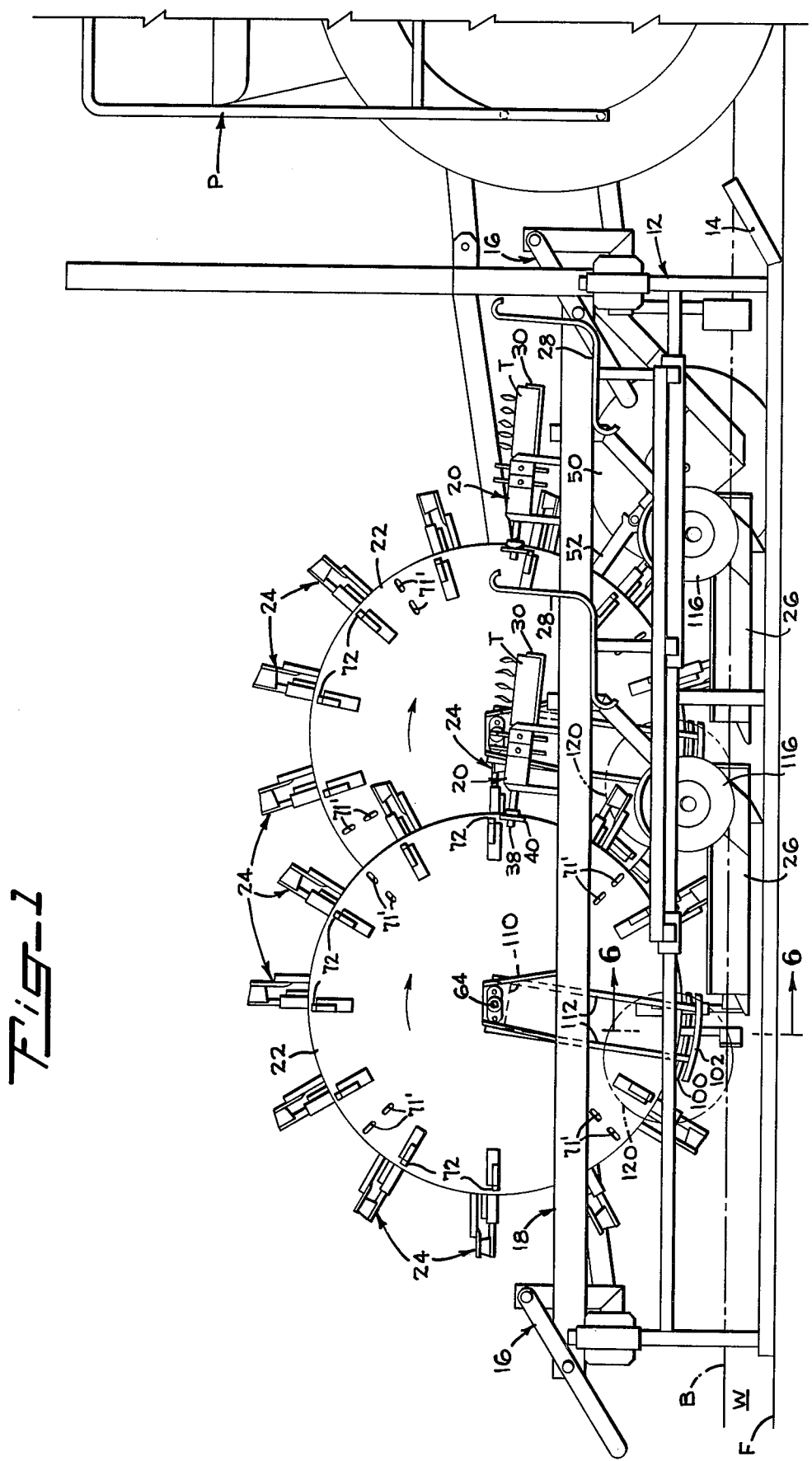
FIG. 1 is a side elevation view of an apparatus embodying the invention.

The transplanter of the invention is operable to be drawn over a prepared field surface that defines furrows F between which are formed upstanding planting beds or berms B. As will appear, the invention is adapted to deposit two rows of seedlings in each berm. The apparatus has a frame 12 supported on runners 14 which are drawn along the surfaces of furrows F by a tractor or like prime mover P. Suspended from frame 12 by suitable parallelogram linkages 16 is a subframe 18 on which are secured the principal operative elements of the transplanter. The transplanter includes one or more generally horizontal conveyors 20 with each of which is associated a transport wheel 22. Each transport wheel 22 carries a plurality of clamp assemblies 24 which operate to receive seedling bodies from conveyor 20 and transport the bodies downward into a trench formed by and within a shoe 26.

Before proceeding with a more detailed description of the apparatus embodying the present invention, the characteristics of a seedling body which the invention is adapted to handle and transplant will be described having reference to U.S. Pat. No. 3,667,159. The U.S. Pat. No. 3,667,159 patent discloses a seedling tray having a plurality of pyramid shaped cavities into which plant growing media and a seed are placed. The tray is then placed in a greenhouse or like environment so that the seed can germinate and growth can start. After germination and partial growth, a procedure requiring approximately one month in the case of lettuce, the seedling bodies are formed, each body having a pyramid shaped root supporting media from which extends the stalks and/or leaves of the seedling. An exemplary seedling body is indicated at S in the appended drawings. Because the seedling bodies are relatively fragile, great care in their handling is required. The present invention comports with such requirement.

Associated with each planting wheel 22, which corresponds to a trench in berm B, is an operator's seat 28 which is positioned so that conveyor 20 will be accessible to an operator occupying the seat. Between the seat and conveyor 20 is a tray support frame 30 for supporting a seedling tray T of the type exemplified in the above cited U.S. Pat. No. 3,667,159. Accordingly, the apparatus includes means for affording transfer of seedling bodies S from tray T to conveyor 20.

Figure 3:
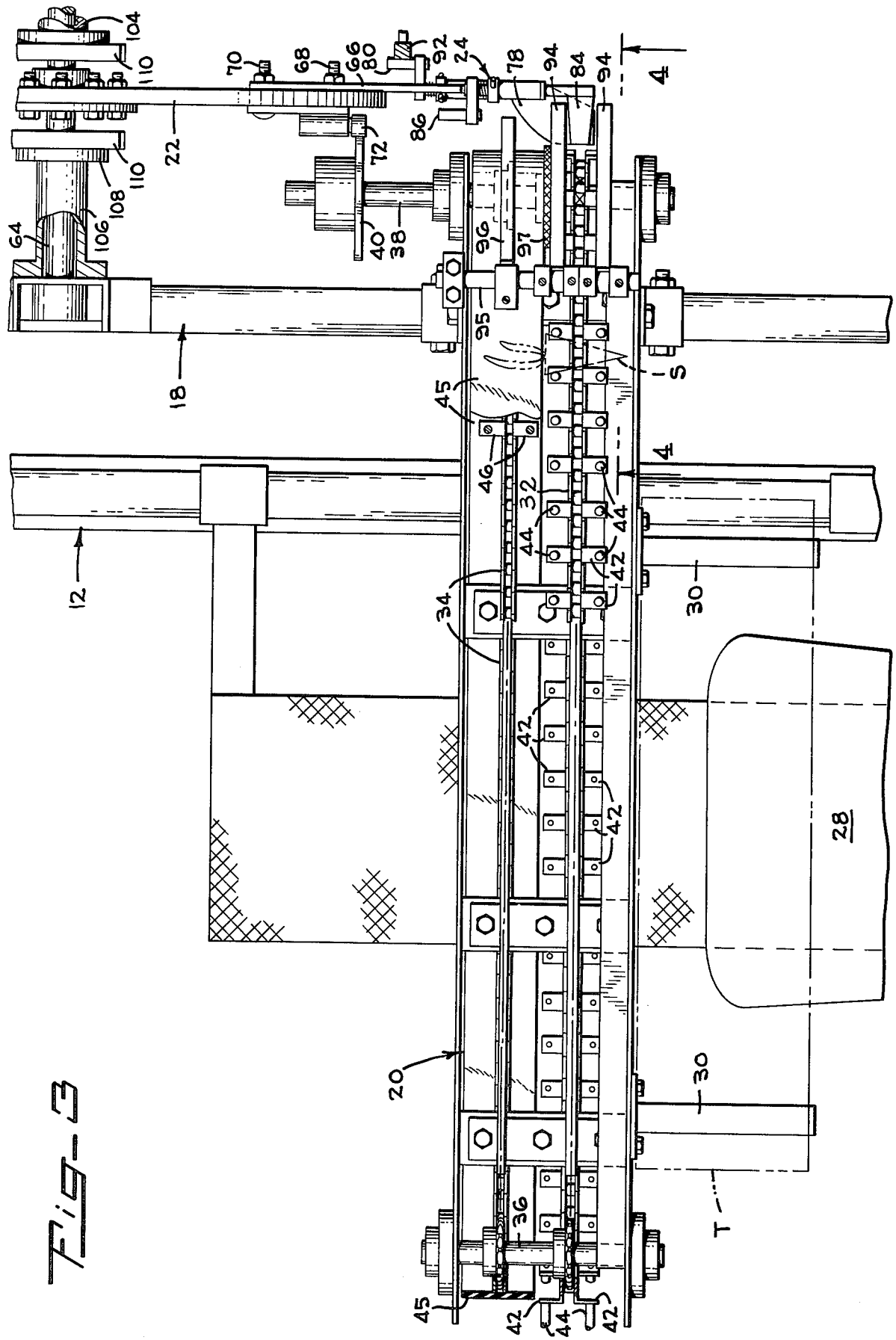
FIG. 3 is a fragmentary plan view at enlarged scale showing the plant conveyor embodying the invention.

As seen most clearly in FIGS. 3 and 4 conveyor 20 includes a first roller chain 32 and a second roller chain 34. Roller chains 32 and 34 are supported at the outer end of conveyor 20 by sprockets mounted on an idler shaft 36. The opposite ends of the roller chains are trained around sprockets secured to a driven shaft 38 which has a star gear 40 for effecting properly timed rotation of shaft 38 to advance the roller chains rightward as viewed in FIG. 3.

Chain 32 carries a plurality of uniformly spaced apart brackets 42; each bracket supports a pair of upstanding pegs or dowels 44. The pitch of chain 32 is such that the longitudinal distance between adjacent dowels 44 is slightly less than the maximum dimension of seedling body S.

Chain 34 supports an endless conveyor belt 45 in parrallelism with the path of travel of dowels 44. One or more brackets 46 secure the belt to chain 34 and because both chains 32 and 34 are driven by sprockets fixed to shaft 38, they travel in unison. The upper surface of belt 45 supports the leaves or stalks extending from the root supporting media that constitutes a part of seedling body S. Accordingly, an operator sitting in seat 28 can remove the seedling bodies from a tray supported on tray support frame 30 and place the seedling bodies between longitudinally adjacent dowels 44. The longitudinal spacing between the dowels and the tapering pyramidal form of the root support media cooperate to facilitate establishment of a uniform transverse position of the seedling bodies. Belt 45 supports the leaves or stalks growing from the root supporting media.

Conveyor 20 is driven in response to rotation of transport wheel 22. The transport wheel is driven from a power wheel 50 (see FIGS. 1 and 2) which is drawn along the surface of furrow F and is supported on subframe 18. Conventional drive trains having shafts 52, universal joints 54 and gear boxes 56 convey torque from power wheel 50 to transport wheel support shafts 58, 60, 62 and 64. The drive trains are arranged to rotate transport wheels 22 at a speed such that seedling bodies S have no movement relative to the field surface when at the bottom of the arcuate path traversed by the bodies in consequence of rotation of the respective transport wheels. Accordingly, when a plant is transported from conveyor 20 and reaches a vertical position within the trench formed by shoe 26, properly timed release of the seedling body assures accurate placement of the same within the trench. Clamp assemblies 24 are configured to engage securely the seedling body and to afford release of the same at the proper time and location.

Figure 2:
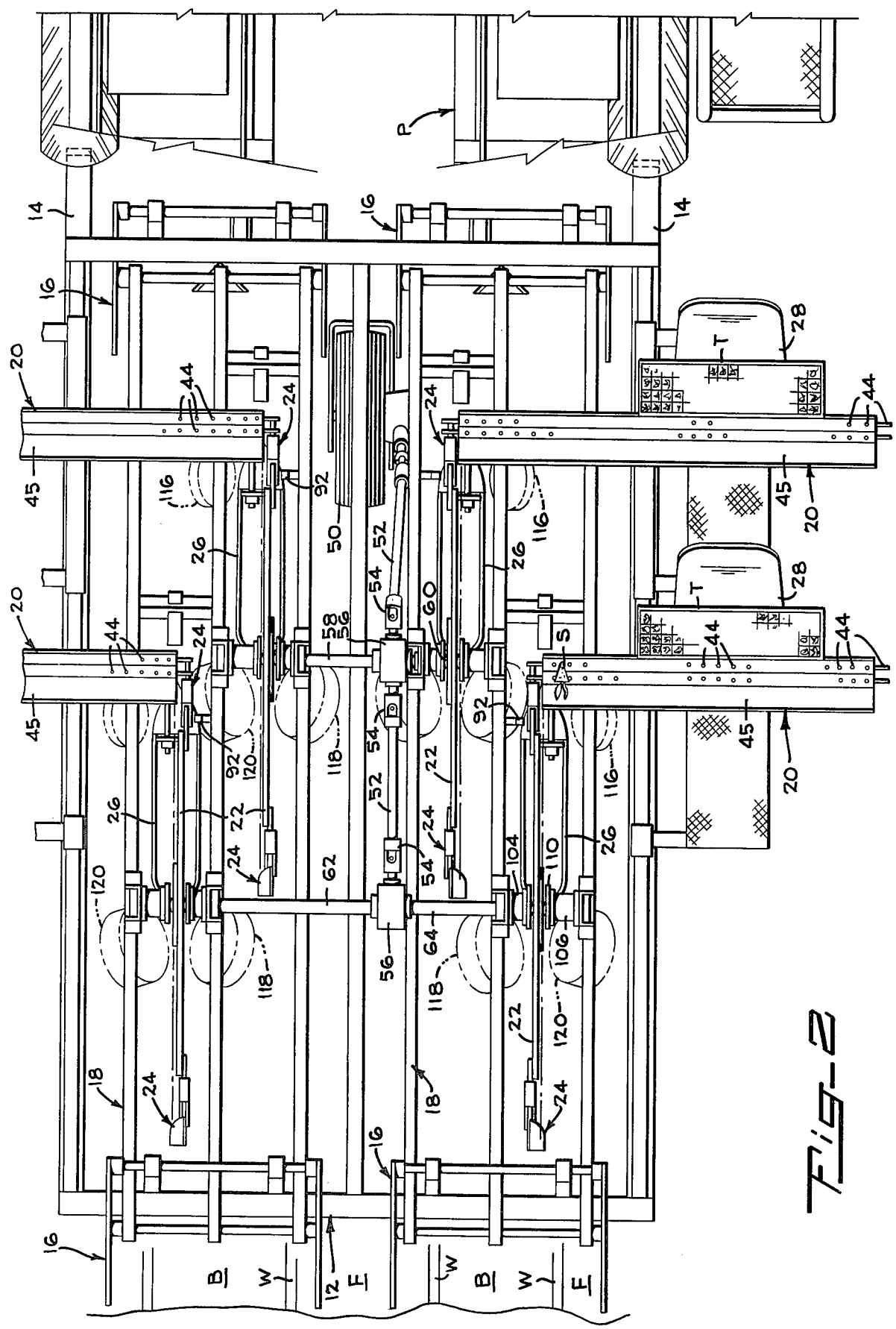
FIG. 2 is a fragmentary plan view of the apparatus of FIG. 1.

Because clamp assemblies 24 are identical to one another, a detailed description of one will suffice as a description of all. Referring to FIGS. 6, 7 and 8, each clamp assembly 24 includes a rigid bar 66 which is bolted, by means of bolts 68 and 70, to transport wheel 22 so as to extend radially therefrom. As seen in FIGS. 1 and 5, transport wheel 22 is provided with pairs of radially aligned holes 71 for receiving bolts 68 and 70 therethrough. The holes are radially elongate to afford adjustment of the radial position of clamp assemblies 24. Holes 71 are spaced throughout the peripheral margin of transport wheel 22 in accordance with the spatial interval desired for the plants on the field surface. In the embodiment shown in the drawings, the hole pairs are disposed at 30° intervals throughout the circumference of transport wheel 22 (to accommodate twelve clamp assemblies 22) and in addition there are four additional hole pairs 71' spaced to provide hole pairs at 45° intervals (to accommodate eight clamp assemblies).

In addition to fixing bar 66 onto transport wheel 22, bolts 68 and 70 retain a roller cam 72 which cooperates with star gear 40 to drive conveyor 20 in proper timed sequence, as will be explained in more detail hereinbelow. Bar 66 outward of the edge of transport wheel 22 supports a leading bushing 73 on the leading edge thereof and a trailing bushing 74 on the trailing edge thereof. Bushing 73 supports a shaft 76 to the distal end of which is fixed a leading seedling body clamping plate 78 and to the opposite end of which is secured an offset cam follower 80 which cooperates with a cam to be described hereinbelow to effect controlled pivotal movement of the clamping plate. Bushing 74 supports a shaft 82 to the distal end of which is fixed a trailing L-shaped clamping plate 84 and to the opposite end of which is secured an offset cam follower 86. Springs 88 and 90 bias clamping plates 78 and 82, respectively, to a seedling body engaging position depicted by solid lines in FIG. 8, a position at which the plates are approximately perpendicular to the plane of transport wheel 22. As shown in FIGS. 6 and 7, springs 88 and 90 circumscribe respective shafts 76 and 82 with the lower ends of the springs being fastened to respective bushings 73 and 74, and the upper ends of the springs being fastened to the offset portion that support respective cam followers 80 and 86. Thus, springs 88 and 90 constitute means for resiliantly biasing the shafts so that plates 78 and 84 reside in a gripping position at which the plates are substantially parallel to one another and extend approximately perpendicular to the plane of wheel 22. The clamping plates 78 and 84 remain in the solid line position of FIG. 8 throughout all rotative positions thereof except when a seedling body is dispensed thereinto from conveyor 20 and when the seedling body is discharged into the trench formed within shoe 26.

As seen most clearly in FIG. 4 there is a fixed cam 92 adjacent the inner end of conveyor 20 which is positioned to cooperate with cam follower 80 in order to open leading clamp plate 78 to receive a seedling body from the conveyor. Trailing clamping plate 84 is not pivoted during the transfer of a seedling from conveyor 20 to the clamp assembly because the width of trailing clamping plate 84 is less than the space between adjacent dowels or pegs 44. The circumferential location of the leading surface 92a of cam 92 is not critical so long as the leading clamping plate 78 is pivoted into approximate parallelism with transport wheel 22 early enough that the clamping plate can pass the discharge end of conveyor 20. The trailing edge 92b of the cam, however, must be rather precisely positioned in order that clamping plate 78 moves toward clamping plate 84 as the seedling bodies fall by gravity from conveyor 20. The trailing edge 92b of cam 92 is positioned as shown in FIG. 4 so that clamping plate 78 pivots in a clockwise direction against a dowel positioned as indicated at 44'. This arrangement permits the leading clamping plate to close against clamping plate 84 when dowel 44' has rotated further in a clockwise direction from the position seen in the Figure.

As clamping plate 78 is being pivoted open to receive a seedling body from conveyor 20, roller cam 72 advances in unison with the clamping assembly and cooperates with star gear 40 to advance the conveyor by an amount such as to discharge one and only one seedling body into the clamping assembly. The teeth on star gear 40 are shaped in relation to the longitudinal spacing between adjacent dowels 44 such that one and only one seedling body is fed into the clamping assembly as it passes the position shown in FIG. 4.

Arcuate guide bars 94 are pivotally mounted on a cross shaft 95 to retain the seedling body on the outlet end of conveyor 20 until the clamp assembly has advanced to a position at which it can receive and firmly secure the seedling body, i.e., after cam follower 80 clears trailing end 92b of cam 92. Because arcuate guide bars 94 are in alignment with dowels 44, they control the root supporting media of seedling body S as the seedling body is discharged from conveyor 20. For guiding the leaves of the seedling body there is a stationary arcuate guide bar 96 in alignment with conveyor belt 45. The latter arcuate guide bar is rigid with shaft 95 because of the relative flexibility of the leaves. At the discharge end of conveyor 20, between dowels 44 and conveyor belt 45, there is a friction wheel 97 secured to shaft 38 for rotation therewith. The friction wheel has a surface of rubber or the like and a diameter greater than that of the arcuate path traversed by roller chain 32 as it moves over the sprockets on shaft 38. Friction wheel 97 functions to accelerate the leaves of the seedling body so that the seedling body is straight (i.e., parallel to the plane of transport wheel 22) when the body is transferred to clamp assembly 24. Thus at all times the seedling body is controlled. The transfer of the seedling body from conveyor 20 to the clamping assembly is achieved without significant vibration or abrupt forces which might tend adversely to affect the relatively fragile root supporting media portion of the seedling body.

Not only does the cooperation between roller cam 72 and star gear 40 assure handling the seedling body without damage thereto but, as will appear, automatically synchronizes the operation of conveyor 20 for all planting rates. More particularly, it will be noted that in FIG. 1 clamping assemblies 24 are disposed on wheel 22 at 30° intervals throughout the circumference of wheel. If intermediate hole pairs 71' are employed, clamping assemblies 24 can be spaced at 45° intervals; properly synchronized operation of conveyor 20 is achieved because the conveyor is advanced by cam rollers and because each clamping assembly includes a cam roller 72. Thus the means for driving the conveyor 20 in response to rotation of the transport wheel, through cooperation of star gear 40 and roller cam 72, assures proper synchronization irrespective of the planting interval.

The other position during rotation of transport wheel 22 where clamping plates 78 and 84 are pivotted to an open position is at the bottom or 6 o'clock position of the planting wheel, i.e. when the seedling body is deposited into the trench formed within shoe 26. For this purpose there are supported adjacent the 6 o'clock position an arcuate cam 100, which cooperates with cam follower 80 to pivot clamping plate 78, and an arcuate cam 102 which cooperates with cam follower 86 to pivot clamping plate 84. For securing cams 100 and 102 in the proper location there are non-rotatable sleeves 104 and 106 which are secured to sub-frame 18 and circumscribe the wheel drive shaft such as shaft 64. The sleeves each have a flange 108 to which are adjustably fixed brackets 110 from which cam mounting arms 112 extend. The cams 100 and 102 are fixed to the free ends of the arms. The arms 112 that mount cam 102 are longer than the arms that mount cam 100 in order that the cams reside at radial positions in alignment with the respective cam followers 80 and 86. Because brackets 110 are adjustable, the circumferential position of cams 100 and 102 can be established to effect properly synchronized operation of clamping plates 78 and 84.

The specific embodiment of the invention shown in the drawings is adapted to place two rows of plants in each berm so that as shoes 26 are moved through the berm, the sides of the trenches that are adjacent the berm side wall, indicated at W, tend to be unstable because they have less lateral support than the trench sides toward the center of the berm. In order that the walls that define the trenches formed by the shoes are symmetrical, there is an obliquely oriented roller or wheel 116 which is supported on subframe 18 so as to maintain the contour of berm wall W and the mount M raised above the normal berm surface level L by movement of the shoe through the berm. The roller 116 is disposed in alignment with the forward portion of the shoe (see FIG. 9) because the mounds are formed by such forward portion. Because the rearward surfaces of shoes 26 are parallel to the direction of machine travel, the mounds require no support rearward of rollers 116. The side of the trench on the opposite side of the shoe, i.e. the side adjacent the center of the berm, is sufficiently stable without provision of a roller or wheel similar to wheel 116 so that a symmetrical trench as shown in FIG. 6 is produced. Into this trench the seedling body S is transported by clamping mechanism 24, and near the rear outlet of the trench clamping plates 78 and 84 are sequentially pivotted into approximate parallelism with the plane of transport wheel 22 so as to release seedling body S. Immediately downstream of the outlet end of shoe 26 is a pair of obliquely supported packer wheels 118 and 120 which compress in the side walls of the trench and the mounds M to close the trench without dislodging the seedling body from a desired vertical position.

The foregoing detailed description has been confined to one conveyor 20, transplant wheel 22 and shoe 26; it is to be understood that the specific embodiment shown in the drawings employs four separate stations which operate in unison to transplant four rows of seedlings, two rows per berm.

In operation, clamp assemblies 24 are installed onto transport wheels 22 at appropriate intervals, depending on the spacing between plants that is desired, trays T of seedling bodies S are placed on tray support frames 30, operators occupy seats 28 and the transplanting apparatus is drawn over the field by tractor P, runners 14 following two furrows and wheel 50 traversing the intermediate furrow. The operators manually remove the seedling bodies from the tray and place them onto conveyor 20, the longitudinal spacing between adjacent dowels 44 assisting in establishing the correct lateral positioning of the seedling bodies. The surface of conveyor belt 45 supports the leaves of the seedling body. As transport wheel 22 is rotatively driven through the drive train operatively connected to wheel 50, the transport wheel rotates, in a clockwise direction as seen in FIG. 1. As a given clamping assembly 24 passes the inner end of conveyor 20, the leading clamping plate 78 is pivotted to an open position when cam follower 80 contacts cam 92. Accordingly the clamping plates can freely pass the conveyor because plate 78 is pivotted into approximate parallelism with transport wheel 22 and clamping plate 84 has a width small enough to fit between dowels 44 and between arcuate guide bars 94. As the transport wheel 22 rotates (see FIGS. 4 and 4A) cam roller 72 moves into contact with one of the teeth on star gear 40. This effects rotation of shaft 38 and the sprocket secured thereto and advancement of roller chains 32 and 34. In turn, a bracket 42 and the dowels 44 secured thereto move to a position approximating that shown at 44' in FIG. 4 and a seedling body experiences similar movement.

With the dowel in the position shown all pressure is relieved from the seedling body and the force of gravity causes the seedling body to move downward until further movement is stopped by arcuate guide bars 94 and 96. Guide bars 94 guide the root supporting media and guide bars 96 guide the leaves of the seedling body. Simultaneous with the foregoing, cam follower 80 associated with clamping plate 78 clears edge 92b of cam 92 and further movement of transport wheel 22 permits clamping plates 78 and 84 to embrace the seedling body. Because dowel 44 continues to rotate during occurrence of the foregoing, it does not interfere with smooth transfer of the seedling body from conveyor 20 to clamp assembly 24. In order to achieve reliable and properly timed transfer of the seedling body from the conveyor to the clamping assembly without subjecting the seedling body to excessive impacts or the like, the position of cam 92 is adjustable. The sequence of operations described above recurs each time a given clamping assembly 24 passes the outlet end of conveyor 20. Because the conveyors are advanced by cam rollers 72, the timing of conveyor 20 is proper irrespective of the number and location of clamping assemblies 24 on transport wheel 22 or the speed of rotation of transport wheel.

Further advance of the apparatus over the field surface causes further rotation of transport wheel 22 which moves the clamping assembly into shoe 26. When the clamping assembly enters the shoe and reaches a position in the region designated by line 9A in FIG. 9, which is before the seedling body assumes a vertical or 6 o'clock position, the seedling body is firmly clamped between plate 78 and 84 as shown in FIG. 9A. At the position designated by line 9B in FIG. 9 the seedling body S is approximately vertical within shoe 26 and cam follower 80 engages cam 100 to cause plate 78 to pivot in a clockwise direction to the position shown in FIG. 9B. The seedling body is thus released but the forward surface of the body is momentarily supported by clamping plate 84 so that the body remains upright. During the momentary support of seedling body S by clamping plate 84 there is no movement of clamping plate 84 with respect to the field surface because of the previously mentioned rotational speed of transport wheel 22. Such momentary support of the seedling body is terminated by further rotation of transport wheel 22 to a position designated by line 9C in FIG. 9 at which position cam follower 86 moves into engagement with cam 102. Consequently, clamping plate 84 pivots in a counterclockwise direction as shown in FIG. 9C. At this time the rear open end of shoe 26 moves past the seedling body and soil enters the trench at the rear extremity of the side walls of shoe 26 in response to the forces applied to the walls of the trench by packing wheels 118 and 120. At the position shown in FIG. 9C both plates 78 and 84 are pivotted into substantial parallelism with the plane of transport wheel 22 so that as the transport wheel rotates and translates forward, the clamping plates move away without in any way dislodging the seedling body S. Accordingly, the seedling body is placed within the trench in a substantially vertical position. When packing wheels 118 and 120 have moved past the seedling bodies, planting is complete and each of the seedling bodies is placed at a proper position and orientation to assure proper growth of the plants to maturity.

The presence of elongate slots 71 and 71' in transport wheel 22 permits a degree of radial adjustment of the clamping assemblies so that the vertical position of the plant can be established with precision. Moreover, the desired spacing of the plants in the field surface can be readily varied by installation of the clamping assemblies at different incremental spacing around the periphery of transport wheel 22. Notwithstanding the spacing of the clamping assemblies around the periphery of transport wheel 22, the timing of conveyor 20 will be correct because the conveyor is driven through cam roller 72, which is always in the proper spatial relation to the clamping assembly.

Additionally the invention can operate efficiently in a wide variety of soil conditions. For example, in soft soil which flows in around the seedling body as more rapidly the position of cams 100 and 102 can be adjusted to effect operation of clamping plates 84 and 78 somewhat earlier than has been described above. The adjustment is achieved (see FIG. 3) by adjusting the rotative position of bracket 110 relative to flange 108.

Thus it will be seen that the present invention provides a transplanter which is capable of accurately delivering seedling bodies into a trench and assuring adequate support for the seedling body until the trench is backfilled so as to make the seedling body self-supporting. Moreover, the transplanter can be adapted to accommodate different spacings between adjacent seedlings by the proper removal and installation of clamping bodies 24 around the periphery of transport wheel 22. Finally notwithstanding the spacing of the clamping assemblies on the transport wheel, conveyor 20 will be correctly timed to deliver the seedling bodies to the clamping assemblies in a secure manner and without subjecting the fragile seedling bodies to undue forces.

Although one embodiment has been shown and described it will be obvious that other adaptations and modifications can be made without departing from the true spirit and scope of the invention.

What is claimed is:

1. Apparatus for transplanting into a trench a plant having an elongate body of root supporting media from which a plant stalk extends comprising a circular wheel, means for supporting said wheel for rotation about a horizontal axis above the trench, at least one rigid bar secured to said wheel and extending radially from the periphery thereof, first and second radially extending shafts mounted on said rigid bar, for pivotal movement about respective axes that are spaced apart from one another by an amount corresponding to the transverse dimension of said body of root supporting media, each said shaft having a distal end outward of said rigid bar and a proximal end remote from said distal end, a first gripping plate fixed to the distal end of said first shaft and a second gripping plate fixed to the distal end of said second shaft, said second gripping plate being of generally L-shaped configuration and having a portion remote from said second shaft that extends toward said first plate for spacing said plates in approximate parallel relation to grip said body of root supporting media, means remote from said plates for resiliently biasing said shafts so that said gripping plates reside in a gripping position at which said plates are substantially parallel to one another and extend approximately perpendicularly to the plane of said circular wheel, means remote from the trench for introducing a plant between said plates with the stalk extending radially inward toward said axis, and means for pivoting said shafts against said biasing means away from one another and into approximate parallelism with the plane of said circular wheel so as to reside laterally of said body, said pivoting means acting when said body resides upright in said trench.

2. Transplanting apparatus according to claim 1 wherein said pivoting means includes a first cam follower secured to the proximal end of said first shaft, a second cam follower secured to the proximal end of said second shaft, said cam followers being eccentric of the respective pivot axes of said shafts and residing on opposite sides of said circular wheel, a first cam supported in the path of said first cam follower for coaction therewith, a second cam supported in the path of said second cam follower for coaction therewith, said cams being disposed below the axis of rotation of said wheel and adjacent said trench to effect release of said body when it reaches an upright position in said trench in response to rotation of said circular wheel.

3. Apparatus according to claim 2 wherein said first plate leads said second plate in response to rotation to said circular wheel and wherein said first cam is disposed to pivot said first shaft before said second cam pivots said second shaft.

4. Apparatus according to claim 3 wherein said second gripping plate has a limited radial dimension and wherein said introducing means includes a pair of dowels spaced from one another by a distance greater than said radial dimension so that said second gripping plate can traverse the space between said dowels, means for supporting said dowels for movement along an arcuate path adjacent said wheel, said dowels supporting a plant in the path of movement of said second plate at a loading site, and cam means cooperable with said first cam follower for pivoting said first plate into parallelism with said circular wheel to clear said dowels, last said cam means being limited so as to permit said first plate to move into a plant gripping position after passing said dowels and before release of a plant body therefrom, and means for driving said dowels along said arcuate path in response to movement of said gripping plates therepast.

* * * * *